United States Patent [19]

Boudot et al.

[11] 4,351,906
[45] Sep. 28, 1982

[54] OPHTHALMIC GLASSES WITH HIGH INDICES OF REFRACTION

[75] Inventors: Jean E. Boudot; Jean P. Mazeau, both of Avon; Andre C. Michaud, Nemours, all of France

[73] Assignee: Corning Glass Works, Corning, N.Y.

[21] Appl. No.: 327,771

[22] Filed: Dec. 7, 1981

[30] Foreign Application Priority Data

Jun. 24, 1981 [FR] France .................. 81 12383

[51] Int. Cl.$^3$ .................................. C03C 3/10
[52] U.S. Cl. ............................ 501/74; 501/903
[58] Field of Search ........................ 501/74, 903

[56] References Cited

U.S. PATENT DOCUMENTS

| | | | |
|---|---|---|---|
| 3,902,910 | 9/1975 | Hares et al. ............ | 501/60 |
| 3,973,976 | 8/1976 | Boyd ...................... | 501/61 |
| 4,211,569 | 7/1980 | Hares et al. ............ | 501/61 |
| 4,213,787 | 7/1980 | Faulstich et al. ...... | 501/74 |

*Primary Examiner*—M. L. Bell
*Attorney, Agent, or Firm*—Clinton S. Janes, Jr.

[57] ABSTRACT

The present invention is drawn to glasses suitable for the fabrication of segments or buttons for multifocal ophthalmic lenses. The inventive glasses have refractive indices ranging between about 1.745–1.771, an Abbe number greater than 29 for a refractive index of 1.771 and greater than 31 for a refractive index of 1.745, a softening point between about 640°–700° C., a coefficient of thermal expansion (25°–300° C.) between about $90–98 \times 10^{-7}/°C.$, and satisfactory chemical durability. The glasses consist essentially, expressed in terms of weight percent on the oxide basis, of

| | |
|---|---|
| $SiO_2$ | 28–32.5 |
| $Na_2O$ | 2–9 |
| $K_2O$ | 0–4 |
| $Li_2O$ | 0–1 |
| $K_2O + Na_2O + Li_2O$ | 4–10.5 |
| BaO | 0–22 |
| $La_2O_3$ | 0–20 |
| $BaO + La_2O_3$ | 14–22 |
| PbO | 28.5–34 |
| ZnO | 0–4 |
| $TiO_2$ | 0–9 |
| $ZrO_2$ | 2–6.5 |
| $Nb_2O_5$ | 0–10 |
| $TiO_2 + Nb_2O_5$ | 4.5–12 |
| $ZrO_2 + TiO_2 + Nb_2O_5$ | 6–17 |

3 Claims, No Drawings

OPHTHALMIC GLASSES WITH HIGH INDICES OF REFRACTION

BACKGROUND OF THE INVENTION

The fabrication of multifocal ophthalmic lenses by fusing one or more segments or buttons of a glass with a high refractive index into a cavity provided in a blank of pressed crown glass is well known. In common current practice, the blank is formed of a crown glass with a refractive index of 1.523 and the segment or button is constituted of a glass with a higher index in the range of 1.58–1.71, depending upon the degree of visual correction required for the finished multifocal lens. Glasses designed to comprise the segment or button of such multifocal lenses have been described, for example, in U.S. Pat. Nos. 3,902,910 and 4,211,569. All of the glasses disclosed in those two patents have refractive indices lower than 1.71.

It would be advantageous to utilize segment glasses with higher refractive indices when a very high degree of visual correction is required. In effect, this would permit reducing the depth of the cavity which receives the segment and, consequently, reducing the total thickness of the multifocal lens and, therefore, its weight.

The object of the invention is to provide glasses designed for the formation of segments for multifocal ophthalmic lenses with a refractive index $n_D$ ranging from 1.745–1.771, while having an Abbe number $\nu_D$ which is sufficiently high that undesirable iridescence at the edges of the lenses is precluded.

In addition, since the segment fusing operation necessarily implies the fusing of the latter to the major lens, the segment glass must have physical properties which are similar to those of the major portion, viz., the crown glass. In particular, the coefficients of thermal expansion of the segment and major portion must be closely approximating such that the seal between the two glasses resulting from the fusing step demonstrates a very low level of stress. The non-photochromic crown glass being considered here, called "Blanc de Lunetterie" and manufactured by Corning Glass Works, Corning, New York, exhibits the following properties: a softening point of 707° C., a strain point of 505° C., an annealing point of 538° C., and a coefficient of thermal expansion over the range of 25°–300° C. of $94 \times 10^{-7}/°C$. Consequently, the segment glass must have a softening point of approximately 640°–700° C. and a coefficient of thermal expansion over the range of 25°–300° C. of approximately $90$–$98 \times 10^{-7}/°C$. The stress between the crown glass and the segment glass, as evidenced by birefringence, is evaluated, for example, with a Babinet compensator. It is generally considered satisfactory when a seal with a crown glass demonstrates a birefringence measurement between $-100$ and $+100$ nm/cm. Preferably, this birefringence will lie between $-50$ and $+50$ nm/cm.

Besides the necessary optical properties and the proper viscosity and thermal expansion characteristics, the segment glass must display the chemical durability required for an ophthalmic glass. An evaluation of chemical durability is defined in terms of weight loss and visual appearance after attack. The test currently utilized for ophthalmic applications, viz., the A.O. test, consists of immersing a glass sample, the surfaces of which have been polished, for 10 minutes into a 10% by weight aqueous solution of hydrochloric acid (HCl) at 25° C. and then measuring the weight loss (in mg). A weight loss per unit surface area is thereafter calculated, generally in terms of $mg/cm^2$. The glass surface is also examined visually to detect the presence of defects (iridescence, flaws, dulling, etc.). For the glasses of the present invention, the limit which is not to be exceeded is exemplified by the chemical durability of a segment glass manufactured by Corning Glass Works, Corning, New York, which has been acknowledged to be satisfactory for ophthalmic applications. That glass exhibits a refractive index of 1.681 and is marketed under the code "Ba 683". That glass demonstrates a weight loss of 0.68 $mg/cm^2$ in the A.O. test accompanied with marked surface dulling.

SUMMARY OF THE INVENTION

Therefore, the instant invention concerns glasses for the fabrication of segments or buttons for multifocal ophthalmic lenses with refractive indices of 1.745–1.771, Abbe numbers greater than 29 for a refractive index of 1.771 and greater than 31 for a refractive index of 1.745, softening points of approximately 640°–700° C., coefficients of thermal expansion of approximately $90$–$98 \times 10^{-7}/°C$. over the range of 25°–300° C., and satisfactory chemical durability. Such glasses consist essentially, expressed in terms of weight percent on the oxide basis, of

| Components | Broad Range | Preferred Range |
| --- | --- | --- |
| $SiO_2$ | 28–32.5 | 29–32 |
| $Na_2O$ | 2–9 | 5–8 |
| $K_2O$ | 0–4 | 0 |
| $Li_2O$ | 0–1 | 0 |
| $K_2O + Na_2O + Li_2O$ | 4–10.5 | 5–8 |
| BaO | 0–22 | 0–22 |
| $La_2O_3$ | 0–20 | 0–14 |
| $BaO + La_2O_3$ | 14–22 | 18–22 |
| PbO | 28.5–34 | 30–33 |
| ZnO | 0–4 | 0–3 |
| $TiO_2$ | 0–9 | 5–9 |
| $ZrO_2$ | 2–6.5 | 2–4 |
| $Nb_2O_5$ | 0–10 | 0–6 |
| $TiO_2 + Nb_2O_5$ | 4.5–12 | 5–11 |
| $ZrO_2 + TiO_2 + Nb_2O_5$ | 6–17 | 8–14 |

Besides those constituents the composition may contain up to 0.5% $As_2O_3$ and/or $Sb_2O_3$ to perform their conventional function as fining agents. However, it is preferable not to use them to avoid coloring the glass, particularly when the latter is manufactured in platinum melting units.

A $SiO_2$ content of about 28–32% by weight is deemed desirable for obtaining adequate chemical durability without seriously reducing the refractive indices of the glasses. The tendency of $SiO_2$ to reduce the index is compensated for through the utilization of the greatest possible proportion of oxides which tend to produce high refractive indices in glass, such as $TiO_2$, $Nb_2O_5$, PbO, $ZrO_2$, $La_2O_3$, and BaO. Nevertheless, the content of BaO and $La_2O_3$ must not exceed 22% and 20% by weight, respectively, because the glass crystallizes (devitrifies)b when those proportions are surpassed. However, a total of at least 14% $BaO + La_2O_3$ is required to secure an adequate index. Beginning at 22% $BaO + La_2O_3$ and continuing to greater amounts, the tendency toward devitrification of the glass increases. At least 29% PbO must be included to secure a sufficiently high refractive index, but must not exceed 34%, so as not to reduce the softening point of the glass unduly. In like manner $TiO_2$, which is effective for raising the refractive index, ought not to exceed about 9% by weight so as not to reduce the Abbe number too much and also not to increase devitrification tendency of the glass. At least 2% $ZrO_2$ ought to be present to obtain a high index of refraction and suitable chemical durability, but must not exceed about 6.5% by weight so as to avoid unduly raising the glass liquidus temperature and increasing the rate of crystallization, which results in melting and forming problems in glass manufacture. ZnO is prone to reduce the chemical durability of the glass so no more than about 4% by weight can be tolerated. Nevertheless, it may be useful to utilize a small amount of ZnO to reduce the proportions of BaO and of $La_2O_3$. Alkali metal oxides promote melting of the glass and their proportions must be adjusted in each instance, as is well known by persons skilled in the art, to obtain an acceptable softening point and coefficient of expansion for achieving proper fusion of the segment to the crown glass. $Na_2O$ is preferred to $K_2O$ and $Li_2O$ since $K_2O$ reduces the refractive index and more adversely affects the chemical durability of the glass. $Li_2O$ rapidly reduces the softening point of the glass. $Nb_2O_5$, like $TiO_2$ and $ZrO_2$, is utilized to raise the refractive index and improve the chemical durability of the glass. However, more than 10% by weight should not be employed, because beyond that amount the liquidus temperature rises rapidly. Furthermore, $Nb_2O_5$ is a very expensive component such that it will generally be economically favorable to minimize the amount used. Similar comments are equally applicable to $La_2O_3$. To secure a sufficently high refractive index requires a total amount of $TiO_2+Nb_2O_5$ to exceed 4.5% by weight and the sum of $TiO_2+ZrO_2+Nb_2O_5$ to be at least 6% by weight. At the other extreme, the constraints imposed by softening point and liquidus temperature limit the maximum of those two totals to 12% and 17%, respectively.

Prior Art

U.S. Pat. No. 3,902,910 is directed to the production of segment glasses for ophthalmic lenses having refractive indices between 1.64–1.71 and consisting essentially, in weight percent on the oxide basis, of

| | |
|---|---|
| $SiO_2$ | 33–43 |
| $B_2O_3$ | 0–4 |
| $SiO_2 + B_2O_3$ | 33–43 |
| $Na_2O$ | 4–9 |
| $K_2O$ | 0–4 |
| $Na_2O + K_2O$ | 5–10 |
| BaO | 17–24 |
| CaO | 0–3 |
| $La_2O_3$ | 0–5 |
| $BaO + CaO + La_2O_3$ | 22–26 |
| PbO | 13–28 |
| ZnO | 2–5 |
| PbO + ZnO | 15–30 |
| $TiO_2$ | 2–4 |
| $ZrO_2$ | 3–6 |
| $TiO_2 + ZrO_2$ | 6–9 |

The index of refraction of those glasses is lower than those exhibited by the inventive glasses. That circumstance results from differences in base glass composition, notably in $SiO_2$ and PbO contents. However, to endow the inventive glasses with the physical characteristics required for an ophthalmic segment glass, the other components of the composition must be carefully adjusted.

U.S. Pat. No. 4,211,569 is drawn to segment glasses for ophthalmic lenses having refractive indices between 1.58–1.71 and coefficients of thermal expansion (0°–300° C.) between $60-66 \times 10^{-7}/°C$. The glasses consist essentially, in weight percent on the oxide basis, of

| | |
|---|---|
| $SiO_2$ | 30–50 |
| PbO | 25–50 |
| $B_2O_3$ | 4–8 |
| $Al_2O_3$ | 4–7 |
| BaO | 4–9 |
| $Na_2O$ | 0–3 |
| $Li_2O$ | 0–2 |
| $TiO_2$ | 0.5–3 |
| $ZnO + ZrO_2 + La_2O_3$ | 0–5 |

The indices of refraction and coefficients of thermal expansion of those glasses are lower than those demonstrated by the inventive glasses. Moreover, there are substantial differences existing between the patented glasses and the inventive compositions.

DESCRIPTION OF PREFERRED EMBODIMENTS

With regard to the production of the inventive glasses, neither unusual conditions nor unusual methods are required. Conventional starting materials such as oxides, carbonates, and nitrates may be used in preparing the batches to be melted. Ordinary precautions concerning the purity of the batch materials which are necessary to obtain glasses suitable for optical applications are sufficient. The glass batches may be melted in platinum melting units in an electric furnace at maximum temperatures of about 1300°–1350° C. for about 2–3 hours to insure proper homogeneity, the molten glass is stirred. The glass is then poured into bars which are annealed at approximately 535° C. These melting and forming conditions are self-evidently given only as illustrative and non-limiting, and may be modified as will be obvious to persons, skilled in the art.

The following non-limiting examples are provided for the purpose of illustrating the glasses of the invention. The compositions and properties of those glasses are summarized in the table below.

In these examples the optical properties $n_D$ and $v_D$ were measured on samples which had been subjected to a controlled cooling equal to about 60° C./hour. The softening temperature (S.P.) in °C. and the coefficient of thermal expansion (Exp.) in terms of $\times 10^{-7}/°C$. were determined by methods conventional in the glass art. The seal stress as evidenced by birefringence was measured in terms of nm/cm as described above utilizing a Babinet compensator. In those examples exhibiting a birefringence outside of a preferred range (±50 nm/cm), it would be very easy for the person skilled in the art to make minor corrections in composition to rectify that condition. For example, the substitution of 0.1% $Na_2O$ for 0.1% $SiO_2$ produces approximately +35 nm/cm. The crown glass sealed to the inventive glasses is the above-mentioned "Blanc de Lunetterie". Finally, the chemical durability of each sample was essayed via the A.O. test in terms of $mg/cm^2$.

TABLE

| Weight % | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 30.73 | 31.13 | 30.73 | 31.13 | 30.03 | 30.03 | 30.03 | 30.73 | 29.73 | 29.73 | 29.73 | 28.93 | 28.93 |

TABLE-continued

| Weight % | 1 | 2 | 3 | 4 | 5 | 6 | 7 | 8 | 9 | 10 | 11 | 12 | 13 |
|---|---|---|---|---|---|---|---|---|---|---|---|---|---|
| $Na_2O$ | 6.71 | 6.81 | 6.71 | 6.51 | 5.61 | 5.21 | 5.01 | 7.51 | 7.83 | 8.43 | 7.03 | 5.88 | 5.28 |
| BaO | 8.03 | 8.03 | 11.04 | 8.33 | 16.35 | 19.35 | 21.37 | 5.4 | 5.09 | 0.49 | 11.09 | 17.29 | 21.34 |
| ZnO | 2.69 | — | 2.39 | — | 2.69 | 2.69 | 2.69 | — | — | — | — | — | — |
| $La_2O_3$ | 11.54 | 13.73 | 8.53 | 13.73 | 5.02 | 2.02 | — | 13.05 | 14.05 | 18.05 | 7.55 | 4.05 | — |
| $ZrO_2$ | 3.33 | 3.33 | 3.33 | 2.33 | 3.33 | 3.33 | 3.33 | 3.33 | 3.33 | 3.33 | 3.33 | 3.33 | 3.33 |
| PbO | 31.65 | 31.65 | 31.65 | 32.65 | 31.65 | 31.65 | 31.65 | 31.65 | 30.65 | 30.65 | 30.65 | 30.65 | 30.65 |
| $TiO_2$ | 5.32 | 5.32 | 5.62 | 5.32 | 5.32 | 5.72 | 5.92 | 8.33 | 5.32 | 5.32 | 6.12 | 5.87 | 5.87 |
| $Nb_2O_5$ | — | — | — | — | — | — | — | — | 4.00 | 4.00 | 4.50 | 4.00 | 4.60 |
| $n_D$ | 1.7497 | 1.7506 | 1.7481 | 1.7510 | 1.7491 | 1.7490 | 1.7494 | 1.7663 | 1.7663 | 1.7688 | 1.7683 | 1.7707 | 1.7685 |
| $v_D$ | 31.34 | 31.60 | 31.25 | 31.41 | 31.32 | 31.25 | 31.04 | 29.84 | 30.35 | 30.28 | 29.79 | 29.87 | 29.87 |
| S.P. | 650 | 662 | 645 | 656 | 652 | 652 | — | 659 | 667 | 672 | 662 | — | — |
| Exp | 94 | 94 | — | — | 94 | — | — | 93.1 | 94.4 | — | — | — | — |
| nm/cm | 0 | −50 | 85 | −25 | 30 | 15 | 95 | −35 | −35 | −95 | −100 | −70 | −70 |
| $mg/cm^2$ | 0.090 | 0.012 | 0.050 | — | — | — | — | 0.018 | — | — | — | — | — |

The most preferred composition consists essentially of

| | |
|---|---|
| $SiO_2$ | 30.9 |
| $Na_2O$ | 6.7 |
| BaO | 8.0 |
| ZnO | 2.7 |
| $La_2O_3$ | 11.5 |
| $ZrO_2$ | 3.3 |
| PbO | 31.6 |
| $TiO_2$ | 5.3 |

We claim:

1. A glass suitable for the fabrication of segments or buttons for multifocal ophthalmic lenses having a refractive index between 1.745–1.771, an Abbe number greater than 29 for a refractive index of 1.771 and greater than 31 for a refractive index of 1.745, a softening temperature between approximately 640°–700° C., a coefficient of thermal expansion (25°–300° C.) of approximately $90-98 \times 10^{-7}/°C$. and satisfactory chemical durability, which consists essentially, espressed in terms of weight percent on the oxide basis, of

| | |
|---|---|
| $SiO_2$ | 28–32.5 |
| $Na_2O$ | 2–9 |
| $K_2O$ | 0–4 |
| $Li_2O$ | 0–1 |
| $K_2O + Na_2O + Li_2O$ | 4–10.5 |
| BaO | 0–22 |
| $La_2O_3$ | 0–20 |
| $BaO + La_2O_3$ | 14–22 |
| PbO | 28.5–34 |
| ZnO | 0–4 |
| $TiO_2$ | 0–9 |
| $ZrO_2$ | 2–6.5 |
| $Nb_2O_5$ | 0–10 |
| $TiO_2 + Nb_2O_5$ | 4.5–12 |
| $ZrO_2 + TiO_2 + Nb_2O_5$ | 6–17 |

2. A glass according to claim 1 consisting essentially, expressed in terms of weight percent on the oxide basis, of

| | |
|---|---|
| $SiO_2$ | 29–32 |
| $Na_2O$ | 5–8 |
| BaO | 0–22 |
| $La_2O_3$ | 0–14 |
| $BaO + La_2O_3$ | 18–22 |
| PbO | 30–33 |
| ZnO | 0–3 |
| $TiO_2$ | 5–9 |
| $ZrO_2$ | 2–4 |
| $Nb_2O_5$ | 0–6 |
| $TiO_2 + Nb_2O_5$ | 5–11 |
| $ZrO_2 + TiO_2 + Nb_2O_5$ | 8–14 |

3. A glass according to claim 1 consisting essentially, expressed in terms of weight percent on the oxide basis, of

| | |
|---|---|
| $SiO_2$ | 30.9 |
| $Na_2O$ | 6.7 |
| BaO | 8.0 |
| ZnO | 2.7 |
| $La_2O_3$ | 11.5 |
| $ZrO_2$ | 3.3 |
| PbO | 31.6 |
| $TiO_2$ | 5.3 |

* * * * *